US 6,405,219 B2

(12) United States Patent
Saether et al.

(10) Patent No.: US 6,405,219 B2
(45) Date of Patent: *Jun. 11, 2002

(54) METHOD AND SYSTEM FOR AUTOMATICALLY UPDATING THE VERSION OF A SET OF FILES STORED ON CONTENT SERVERS

(75) Inventors: Christian D. Saether; David E. Sloat, both of Seattle, WA (US)

(73) Assignee: F5 Networks, Inc., Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,894

(22) Filed: Sep. 24, 1999

Related U.S. Application Data

(60) Provisional application No. 60/140,213, filed on Jun. 22, 1999.

(51) Int. Cl.[7] ............................................. G06F 17/30
(52) U.S. Cl. ...................... 707/201; 709/219; 709/232; 709/246
(58) Field of Search .................. 707/10, 101, 202–205; 709/219

(56) References Cited

U.S. PATENT DOCUMENTS

| 3,950,735 A | 4/1976 | Patel ........................ 340/172.5 |
| 4,644,532 A | 2/1987 | George et al. ................ 370/94 |
| 4,965,772 A | 10/1990 | Daniel et al. ............... 364/900 |

(List continued on next page.)

FOREIGN PATENT DOCUMENTS

| EP | 0 744 850 A2 | 11/1996 |
| WO | WO 91/14326 | 9/1991 |
| WO | WO 95/05712 | 2/1995 |

(List continued on next page.)

OTHER PUBLICATIONS

"Servlet/Applet/HTML Authentication Process With Single Sign–On," *Research Disclosure 429128*, IBM Corporation, pp. 163–164, Jan. 2000.

"A Process for Selective Routing of Servlet Content to Transcoding Modules," *Research Disclosure 422124*, IBM Corporation, pp. 889–890, Jun., 1999.

*Primary Examiner*—Safet Metjahic
*Assistant Examiner*—Haythim Alaubaidi
(74) *Attorney, Agent, or Firm*—Merchant & Gould P.C.; John W. Branch

(57) ABSTRACT

A method and system for managing the replication and version synchronization of updates to a set of source files on geographically distributed heterogeneous content servers with minimal impact on a network's bandwidth. The configuration of each content server is either manually entered or automatically determined. The current version of the source files are created on at least one source server. A Primary global server stores a copy of the current version of the set of the source files along with the configuration of each content server. The Primary global server generates and distributes a particular version change container and version distribution list to each remotely located Secondary global server. Each Secondary global server employs the version distribution list and the contents of the version change container to identify the current version of each source file necessary to upgrade the set of source files on each local content server. Each identified source file is copied to a sub-directory on each local content server associated with the Secondary global server. At each local content server, the renaming of each copied source file is employed to update to the current version of the set of source files on the content server. A versioned file tree repository for the set of source files includes archived objects. When the version distribution list identifies a previous version, the current version of source files on the local content servers can be rolled back to the previous version.

42 Claims, 9 Drawing Sheets

U.S. PATENT DOCUMENTS

| | | | |
|---|---|---|---|
| 5,023,826 A | 6/1991 | Patel | 364/736 |
| 5,053,953 A | 10/1991 | Patel | 364/200 |
| 5,299,312 A | 3/1994 | Rocco, Jr. | 395/200 |
| 5,327,529 A | 7/1994 | Fults et al. | 395/155 |
| 5,367,635 A | 11/1994 | Bauer et al. | |
| 5,371,852 A | 12/1994 | Attanasio et al. | 395/200 |
| 5,406,502 A | 4/1995 | Haramaty | 364/551.1 |
| 5,475,857 A | 12/1995 | Dally | 395/800 |
| 5,517,617 A | 5/1996 | Sathaye et al. | 395/200.1 |
| 5,519,694 A | 5/1996 | Brewer et al. | 370/54 |
| 5,519,778 A | 5/1996 | Leighton et al. | 380/30 |
| 5,521,591 A | 5/1996 | Arora et al. | 340/826 |
| 5,528,701 A | 6/1996 | Aref | 382/178 |
| 5,581,764 A | 12/1996 | Fitzgerald et al. | |
| 5,596,742 A | 1/1997 | Agarwal et al. | 395/500 |
| 5,606,665 A | 2/1997 | Yang et al. | 395/200.2 |
| 5,611,049 A | 3/1997 | Pitts | 395/200.9 |
| 5,663,018 A | 9/1997 | Cummings et al. | 430/5 |
| 5,678,042 A * | 10/1997 | Pisello et al. | 707/10 |
| 5,752,023 A | 5/1998 | Chourci et al. | 395/610 |
| 5,761,484 A | 6/1998 | Agarwal et al. | 395/500 |
| 5,768,423 A | 6/1998 | Aref et al. | 384/228 |
| 5,774,660 A | 6/1998 | Brendel et al. | 395/200.31 |
| 5,778,395 A * | 7/1998 | Whiting et al. | 707/204 |
| 5,790,554 A | 8/1998 | Pitcher et al. | 3704/471 |
| 5,875,296 A | 2/1999 | Shi et al. | 395/188.01 |
| 5,892,914 A | 4/1999 | Pitts | 395/200.49 |
| 5,919,247 A | 7/1999 | Van Hoff et al. | |
| 5,933,834 A * | 8/1999 | Aichelen | 707/103 |
| 5,936,939 A | 8/1999 | Des Jardins et al. | 370/229 |
| 5,946,690 A | 8/1999 | Pitts | 707/10 |
| 5,949,885 A | 9/1999 | Leighton | 380/54 |
| 5,959,990 A | 9/1999 | Frantz et al. | 370/392 |
| 5,974,460 A | 10/1999 | Maddalozzo, Jr. et al. | 709/224 |
| 5,983,281 A | 11/1999 | Ogle et al. | 709/249 |
| 6,006,260 A | 12/1999 | Barrick, Jr. et al. | 709/224 |
| 6,006,264 A | 12/1999 | Colby et al. | 709/226 |
| 6,026,452 A | 2/2000 | Pitts | 710/56 |
| 6,028,857 A | 2/2000 | Poor | 370/351 |
| 6,051,169 A | 4/2000 | Brown et al. | 264/40.1 |
| 6,076,105 A * | 6/2000 | Wolff et al. | 707/10 |
| 6,078,956 A | 6/2000 | Bryant et al. | 709/224 |
| 6,085,234 A | 7/2000 | Pitts | 709/217 |
| 6,092,196 A | 7/2000 | Reiche | 713/200 |
| 6,108,703 A | 8/2000 | Leighton et al. | 709/226 |
| 6,111,876 A | 8/2000 | Frantz et al. | 370/392 |
| 6,145,011 A * | 11/2000 | Furukawa et al. | 709/245 |
| 6,173,293 B1 * | 1/2001 | Thekkath et al. | 707/201 |
| 6,298,319 B1 * | 10/2001 | Heile et al. | 703/26 |

FOREIGN PATENT DOCUMENTS

| | | |
|---|---|---|
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

* cited by examiner

METHOD AND SYSTEM FOR AUTOMATICALLY UPDATING THE VERSION OF A SET OF FILES STORED ON CONTENT SERVERS

This application claims priority from Provisional application Ser. No. 60/140,213, filed Jun. 22, 1999.

FIELD OF THE INVENTION

This application relates generally to distributing updates to geographically distributed servers on a network, and, more specifically, to enabling the version of each source file stored on heterogeneous content servers to be automatically updated.

BACKGROUND OF THE INVENTION

Often, source files for web content servers are coded by multiple programmers on remotely located (stage) source servers. It is not unusual for one programmer(s) to code "HTML" files on one source server while another programmer(s) creates executable and/or image files on another source server. Once a programmer debugs a newly created/edited update file, it is eventually distributed to each content server and placed in a corresponding file directory. Historically, the distribution of the current version of a set of "updated" or new files from remotely located source servers through the Internet to content servers has proven to be a difficult task for several reasons. One reason is that the file directory structure and hardware configuration can vary between individual web content servers. In this case, the distribution of a set of files for each web content server must be separately organized according to each server's file directory structure and hardware capabilities. Another reason is that the actual size of the set of files may be so large that their distribution is relatively slow on a network with limited bandwidth capabilities.

Therefore, a need exists for a computer implementable method of distributing a set of the current version of source files to a plurality of content servers using a minimal amount of bandwidth. Preferably, the method will tailor the distribution of the set of source files according to the configuration, i.e., file structure and the hardware constraints, of each content server. Also, preferably the method would provide a facility for rolling back the current version of the set of source files to a previous version. The present invention is directed to providing such a computer implementable method.

SUMMARY OF THE INVENTION

In accordance with the present invention, a computer implementable method for updating a version of a set of source files stored on a content server over a network, comprising: (a) determining a configuration of each content server on the network, the configuration enabling a source file to be copied to a location on the content server; (b) identifying each source file on a source server that is different than any source file stored on a global server; (c) copying each identifiably different source file from the source server to the global server, each source file copied from the source server and a set of source files stored on the global server being employed to create a current version of the set of source files on the global server; and (d) employing the configuration of each content server to copy the current version of each source file that is included in the set of source files on the global server to a directory created on each content server, whereby the version of the set of source files stored on each content server is updated by renaming the current version of each source file copied to the directory on each content server.

In accordance with other aspects of the present invention, the method provides for renaming each current version of each source file that is copied to the directory created on each content server; and deleting the directory created on the content server and deleting another version of each source file that is updated by the renaming of the current version of each source file copied to the content server directory.

In accordance with yet other aspects of the present invention, the method provides for when the current version of each source file is copied to the directory created on each content server, disabling access to the set of source files on a particular content server until the renaming of the current version of each source file copied to the directory on the particular content is completed.

In accordance with still other aspects of the present invention, the method provides for when the current version of each source file is copied to the directory created on each content server, starting the renaming process with the current version of each copied source file that is furthest away from the root directory of each content server.

In accordance with other aspects of the present invention, the method provides for archiving each version of the set of source files in a repository on the global server, the archiving causing each source file to be individually compressed and stored as an archived object in the repository associated with the global server. The repository can be a versioned file tree repository for the set of source files.

In accordance with still further aspects of the present invention, the method provides for when a return to a previous version of the set of source files is requested, retrieving each archived object associated with the previous version of the set of source files from the repository associated with the global server. Each archived object associated with the previous version of the set of source files is unarchived to reconstitute each source file needed to upgrade the set of source files on the content server to the previous version. Each reconstituted source file is copied to a directory created on each content server, whereby the version of the set of source files on each content server is upgraded to the previous version by renaming the copied reconstituted source files.

In accordance with still other aspects of the present invention, the method provides for enabling a user to edit the configuration for each content server. Alternatively, the method may provide for automatically obtain the configuration for each content server.

In accordance with other aspects of the present invention, the method provides for employing a file access protocol to gain file level access to each source file, including FTP, NFS, CIFS and MFTP. The file access protocol may employ one port to send and receive data that includes a message and a source file. The type of source file includes image, hyper text mark-up language (HTML), script, sound, video, text, picture and application program code.

In accordance with yet other aspects of the present invention, the method provides for when a new content server is added to the network, employing the current version of the set of source files stored in a repository on the global server and a configuration of the new content server to replicate the current version of the set of source files in at least one directory created on the new content server.

In accordance with still further aspects of the present invention, the method provides for copying the differences in the set of source files on the source server to a primary global server which generates a particular container that includes the differences in the set of source files stored on each remotely located secondary global server. The primary global server distributes the particular container from the primary global server to each associated secondary global server which employ the contents of the particular container to replicate the current version of the set of source files in a repository on the Secondary global server. The current version of each source file stored in the repository on the Secondary global server that is identified as necessary to replicate the current version of the set of source files on the content server is copied to another directory created on each content server that is local to the secondary global server. The set of source files may be stored in a versioned file tree repository on the primary global server and each secondary global server.

In accordance with yet other aspects of the present invention, the method provides for automatically distributing the container to the secondary global server. Alternatively, the distribution of the container to the secondary global server can be selectively enabled by an input. Also, the updating to the current version of the set of source files on the content server can be automatic or selectively enabled by an input. Additionally, each container can be distributed in a plurality of packets to the secondary global server and each packet may have a size that is less than a size of the container.

In accordance with other aspects of the present invention, the method provides for encrypting each message transmitted between the primary global server and each secondary global server.

In accordance with still other aspects of the present invention, the method provides for distributing a particular list to each secondary global server. The distributed list is employed by each secondary global server to identify the particular version for upgrading the set of sources files on each local content server.

In accordance with still other aspects of the present invention, the method provides for when another global server is added to the network, creating a copy of the versioned file tree repository for the set of source files. The versioned file tree repository for the set of source files is replicated on the other global server which employs the set of source files included in the versioned file tree repository to update the version of the set of source files stored on each content server that is local to the other global server. The type of the other global server may be primary or secondary.

In accordance with other additional aspects of the present invention, a system which implements substantially the same functionality in substantially the same manner as the methods described above is provided.

In accordance with yet other additional aspects of this invention, a computer-readable medium that includes computer-executable instructions that may be used to perform substantially the same methods as those described above is provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
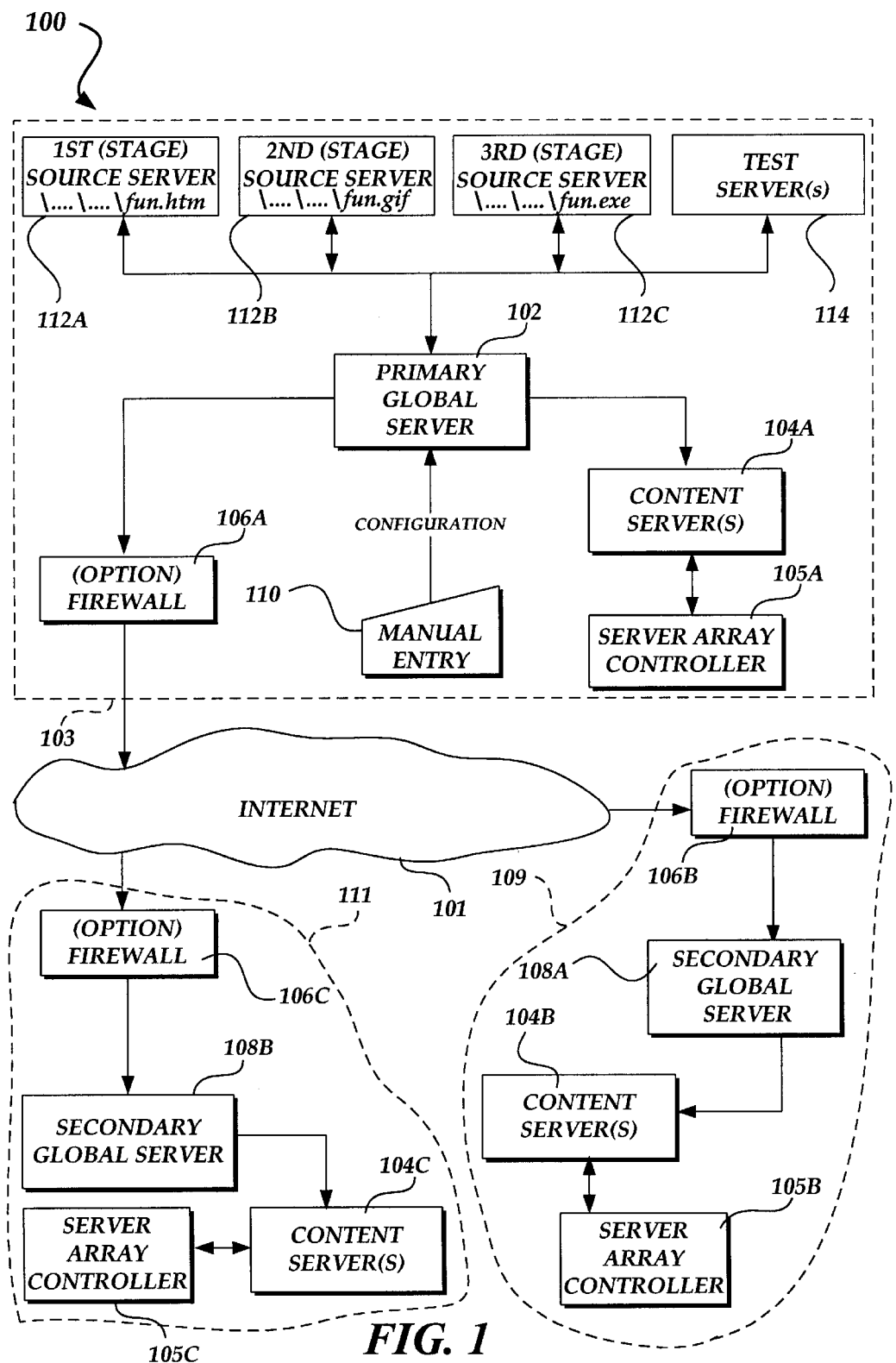
FIG. 1 illustrates an overview of the system architecture for implementing the present invention.

The present invention provides for managing the distribution and synchronization of a set of updated content and application (source) files for remotely located heterogeneous content servers with reduced impact on a network's bandwidth. A particular set of source files for each content server is automatically updated according to the directory structure and hardware configuration of each content server. The present invention is typically employed with a Primary global server that is in communication with local source servers and local content servers. Also, the Primary global server may be used with at least one geographically separate Secondary global server that is in communication with other content servers that are local to the Secondary global server.

Generally, the new or changed (updated) set of source files for the content servers are created on the source servers. The Primary global server stores a representation of the source servers' current version of the set of updated source files either at determined intervals or at the direction of a user. The copied set of source files include the name, time stamp and size of each source file. The Primary global server also stores configuration files indicating the particular file directory structure and hardware constraints for each content server that is locally coupled to the Primary global server and each Secondary global server. The content server hardware constraints are usually entered manually into the Primary global server. Alternatively, the Primary and Secondary global servers may automatically determine access control and account information for each content server on the network.

The Primary global server generates a version delivery list for each Secondary global server that indicates a particular update version for each local content server. The version delivery list also includes the file directory structure and the hardware constraints of each local content server. The Primary global server also generates a version change container for each Secondary global server based on its path and the difference between the updated version of the set of source files stored in a versioned file tree repository on the Primary global server and the current version of the set of source files stored in a another versioned file tree repository on each Secondary global server. At a determined interval, the version delivery lists and the version change containers are distributed from the Primary global server to each Secondary global server. Also, each Secondary global server employs the set of source files included with the version change container to update the version of the set of source files stored in the Secondary global server's versioned file tree repository.

The Primary global server and each Secondary global server generate a current version of the set of new and/or changed source files and files to be removed for each local content server based on the update version identified in the version delivery list. The Primary and Secondary global server generate a content change container that includes the current version of the set of new and/or changed source files and indicates which source files are to be removed on each local content server. Employing the contents of the content change container, each Secondary global server will make the update version changes as indicated in the version delivery list by copying the update version of the set of new and/or changed source files to temporary sub-directories on each of their associated local content servers. Similarly, the Primary global server will copy the update version of the set of new and/or changed source files to temporary sub-directories on each of its associated local content servers. The Primary and Secondary global servers change the version of the set of source files on the local content servers by renaming the update version of the set of source files copied to the temporary sub-directories.

Additionally, when a user indicates that a current version of the set of source files on the local content servers should be rolled back to a previous version, the Primary global server creates a "rollback" version delivery list that is provided to each Secondary global server. A Secondary global server employs the previous version indicated in the rollback version delivery list to generate the previous version of the set of source files necessary to restore the previous version of the set of source files. These source files are copied to a temporary sub-directory on each local content server. Similarly, the Primary global server generates the previous version of the set of source files and copies these files to a temporary sub-directory on each local content server.

The Primary and Secondary global servers rollback to the previous version by renaming the set of source files copied to the temporary sub-directories on the local content servers. Additionally, when the set of source files are copied to the sub-directories on the local content servers, the Primary and Secondary global servers will delete source files that did not exist in the previous version and they may temporarily disable user access to the local content servers until the previous version of the set of source files are renamed.

Encryption may be provided for all communication between the Primary Global server, Secondary global server(s) and the local content servers. Also, file compression may be provided for the distribution of version change containers between the Primary global server and the Secondary global server(s). The present invention may employ any file access method to gain file level access to a source file on a server including a file transport protocol (FTP), network file system (NFS), computer interconnect file system (CIFS) and multi-cast file transfer protocol (MFTP).

System Overview

FIG. 1 illustrates an overview 100 of the present invention employed in a network environment that includes a wide area network such as the Internet 101, FIG. 1 includes a data center 103 coupled to the Internet 101. The data center 102 includes source servers 112A, 112B and 112C for creating file based content and applications, e.g., HTML pages, graphic image format (GIF) images and executables and a test server 114 for testing new and changed source files. The data center 103 also includes a Primary global server 102 in communication with an optional firewall server 106A, local content servers 104A, a server array controller 105A and a manual entry device 110. The Primary global server 102 is connected to the Internet 101 (optionally through firewall server 106A) and is in communication with the source servers 112A–C and the test server 114.

The manual entry device 110 enables a user to provide information for the Primary global server 102 including server configuration, file distribution profiles, hardware constraints and set up rules. The Primary global server 102 provides the current version of a set of source files to the local content servers 104A. The server array controller 105A manages access to the information, e.g., content and applications, on the content servers 104A. Typically, a server array controller manages a pool of redundant content (node) servers to provide access to requested resources such as a BIG/ip™ server array controller available from F5 Networks, Inc., Seattle, Wash.

The Primary global server 102 distributes containers to Secondary global servers 108A and 108B across the Internet 101. The Secondary global servers 108A and 108B form part of geographically separate data centers 109 and 111. The Secondary global servers 108A and 108B are shown coupled through optional firewall servers 106B and 106C, respectively, to the Internet 101. Each of the Secondary global servers 108A and 108B are in communication with one of more local content servers 104B and 104C, respectively. As a result, the Secondary global servers 108A and 108B can provide a current version of a set of source files to their associated local content servers 104B and 104C. Each geographically separate data center 109 and 111 also includes a server array controller 105B and 105C to manage access to the content and applications on the local content servers 104B and 104C. FIG. 1 should be considered exemplary, not limiting. If desired, one or more than two, geographically separated data centers may be included in a network employing the present invention.

In another embodiment, the present invention can be employed to provide updates to a content server that is not managed by a server array controller. Additionally, the Primary global server can implement the present invention without the use of Secondary global servers at geographically separate data centers, such an embodiment of the invention would be employed when all of the content servers are local to the data center that includes the Primary global server.

Flowcharts

Figure 2:
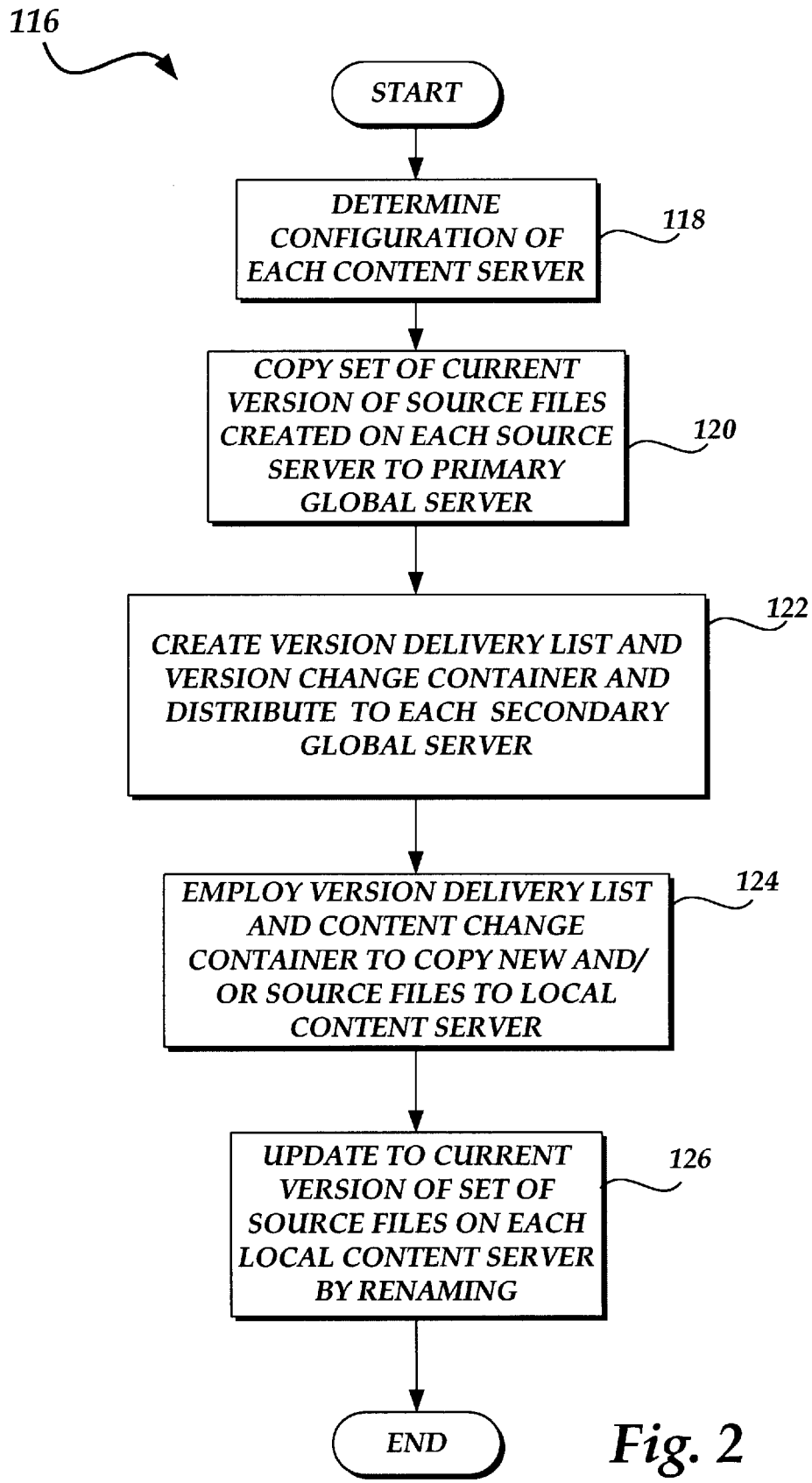
FIG. 2 is a flowchart showing an overview of the logic for updating files on remotely located content servers.

FIG. 2 is a flow chart illustrating an overview 116 of the main logic for providing a current version of a set of source files from at least one source server to a plurality of content servers. Moving from a start block, the logic steps to a block 118 where configuration information from each content server is determined e.g., paths, file directory structure and hardware constraints. The determination can be made by recording entered configuration information (hardware and software). Alternatively, the Primary and Secondary global servers may automatically read the configuration information of each local content server. The configuration information may be provided out of band to each Primary and Secondary global server when new configuration information becomes available and/or at determined intervals.

The logic flows to a block 120 where the set of source files created on the source servers are identified according to name, size and date of creation/modification. A Primary global server copies only those source files from the source servers that are determined to be different than the set of source files stored in the versioned file tree repository on the Primary global server. As a result, the present invention employs differences to identify the source files that are to be copied from the source servers to the Primary global server.

Advancing to a block 122, the Primary global server creates a particular version delivery list for each Secondary global server. The version delivery list indicates the version upgrade for each set of source files on each local content server.

Also, the Primary global server creates a version change container based on the difference between the current version of the set of source files stored in the versioned file tree repository on the Primary global server and the version of the set of source files stored in another versioned file tree repository on each Secondary global server. The version change container references the names of all of the source files that are included in or deleted from the current version of the set of source files. The version change container also includes the actual file data for each new source file and a portion of the file data for each existing source file that was modified in the current version of the set of source files.

After the creation of the version delivery lists and the version change container, the Primary global server provides copies of the version change container and the particular version delivery list on each Secondary global server. It is understood that the Primary global server stores a copy of each version of a source file from a source server that is determined to be different than the version of the source file on the Primary global server. Alternatively, each Secondary global server stores a copy of each version of a source file that is provided in a version change container from the Primary global server in the Secondary global server's versioned file tree repository.

The logic steps to a block 124 where the Primary global server and each Secondary global server create a content change container for each local content server and copy new and/or changed source files to at least one sub-directory on the corresponding local content server. For each Primary and Secondary global server, the copied source files are based on previously determined configuration information for a particular local content server and the version of the set of source files identified in the version delivery list. Since the present invention "assumes" that a previously copied source file on a content server is persistent, another copy of a previously copied and unchanged version of a source file is not included in the set of the current version of source files that are copied to a sub-directory on the local content server, i.e., the Primary and Secondary global servers copy the actual file data for the current version of new and modified source files to sub-directories on local content servers.

The logic flows to a block 126 where the Primary and Secondary global servers update the version of the set of source files on each local content server by renaming the source files copied to a sub-directory on each local content server. Also, any previously copied source files that were removed from the current version of the set of source files are deleted on each content server. When the renaming and/or deleting is completed, the logic will move to an end block and terminate.

Figure 3A:
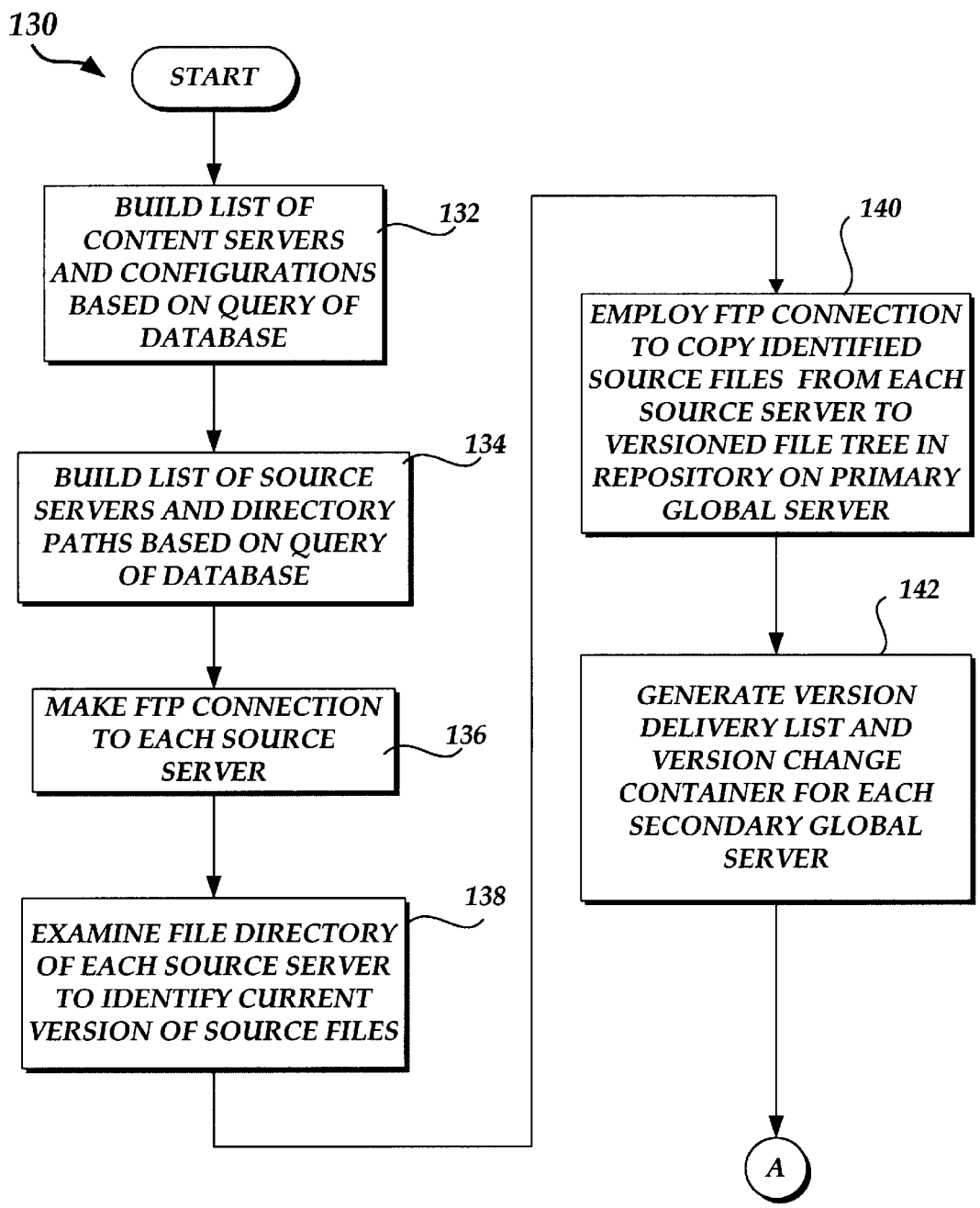
FIGS. 3A–3C are flowcharts that illustrate in more detail the logic for updating files on remotely located content servers.
Figure 3B:
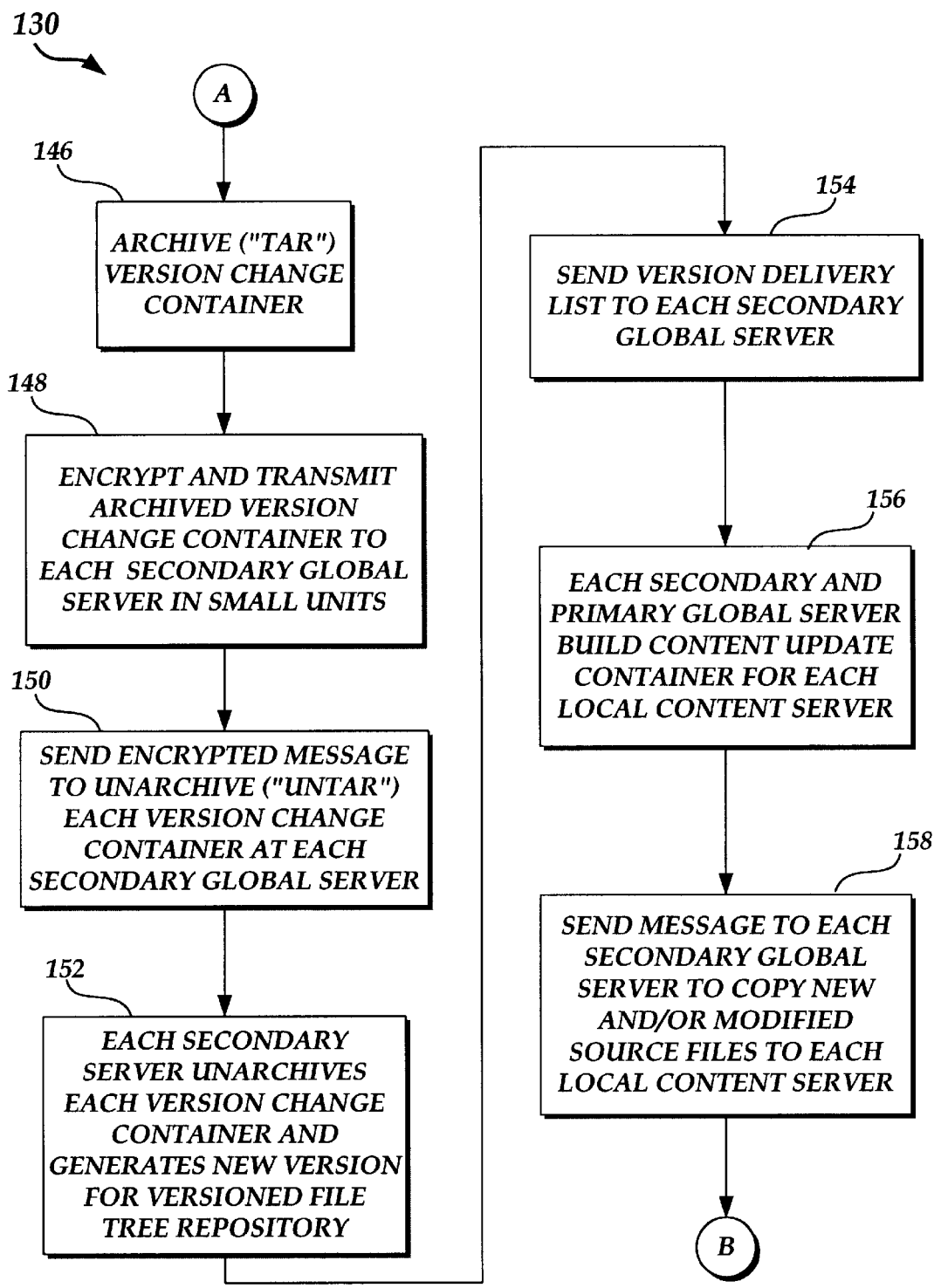
Figure 3C:
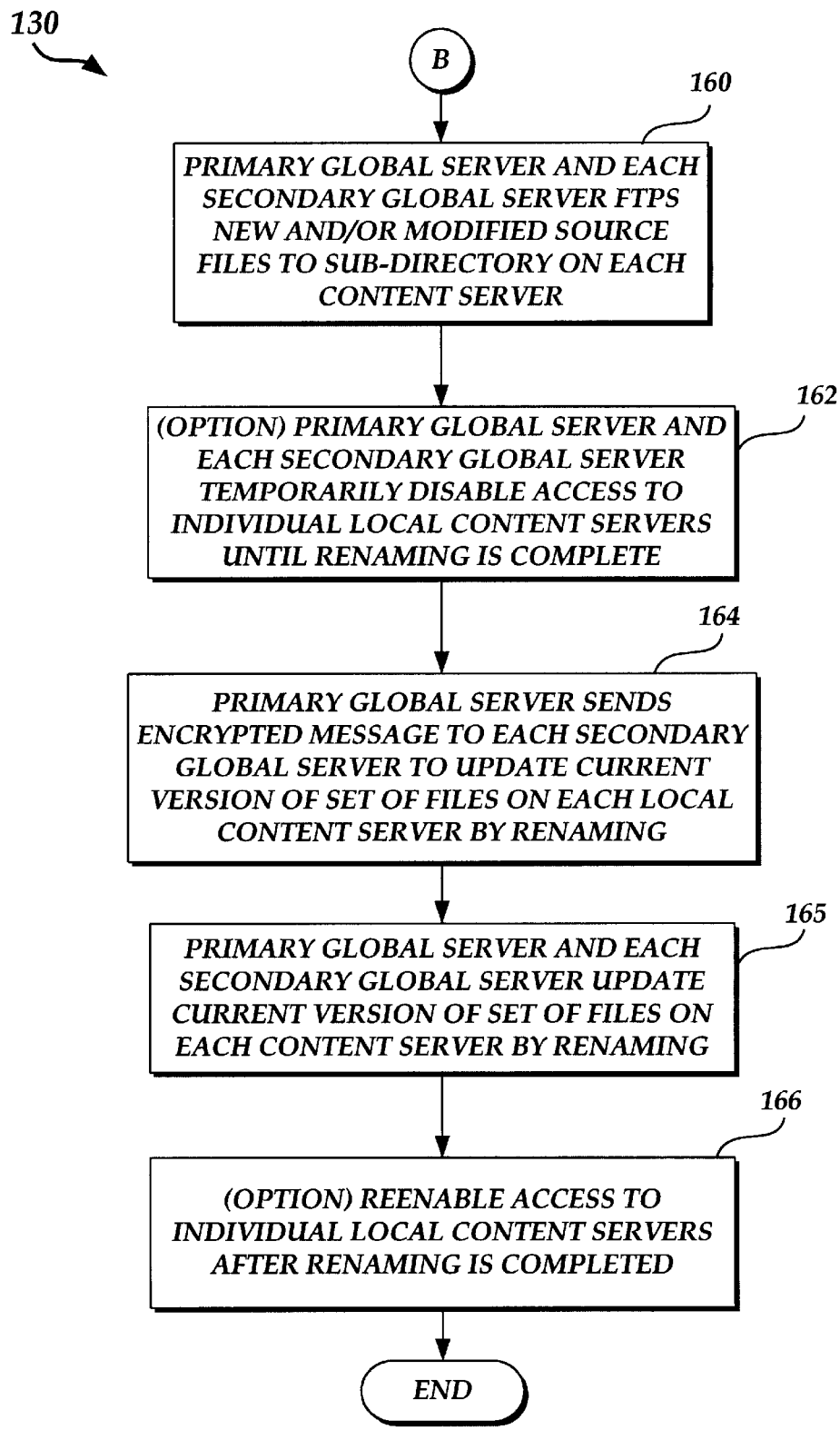

FIGS. 3A–3C form a flowchart 130 that shows in greater detail the logic of the present invention. Starting with FIG. 3A, the logic moves from a start block and steps to a block 132 where the Primary global server queries a database that stores information about content servers coupled to the network and uses the results of the query to build a list of content servers and their hardware/software configuration. The logic flows to a block 134 where the Primary global server uses the results of another query of the database to build a list of the available source servers and their respective paths.

The logic advances to the block 136 where the Primary global server gains file level access to each source server with an FTP connection. The logic steps to a block 138 where the Primary global server examines the source (content and application) files on each source server and identifies each new and/or modified source file by comparing the name, time stamp and size of each source file on each source server to the current version of each source file stored on the Primary global server in a versioned file tree.

When a source file with the same name exists on both a source server and the Primary global server, the present invention identifies the most current version by comparing their sizes and time stamps. If the sizes of the source files with the same name are different or the time stamp of the source file on the source server is different than the time stamp of the Primary global server's source file, the source server's source file is identified as the most current version. Further, when another source file with the same name is not on the Primary global server, the source file on the source server is identified as the current version. Also, when a named source file only exists on a Primary global server, this source file is not identified as a member of the current version of the set of source files.

The logic flows to a block 140 where the Primary global server gains file level access (FTP connection) to each source server that includes a source file that is identified as different than the current version of that particular file in the versioned file tree on the Primary global server. Each identified source file is copied to a new version in the versioned file tree repository on the Primary global server.

The Primary global server calls a library, e.g., the Revision Control Engine (RCE), to store file level differences between the current and previous versions of each source files. A discussion of FIGS. 6A and 6B below presents the functionality of the versioned file tree repository in greater detail.

In another embodiment, another file access protocol may be employed to transfer information, e.g., files, messages and data, between the Primary, Secondary, source and content servers. This other protocol could use a single port to enable all of the functions of the present invention, such as enabling the Primary global server to control the operation of the Secondary global server.

The logic moves to a block 142 where the Primary global server generates version delivery lists and a list of Secondary global servers and their respective paths. Also, the Primary global server generates a version change container for each Secondary global server that may include a reference value associated with the current version of the set of source files.

Turning to FIG. 3B from FIG. 3A, the logic steps to a block 146 where the Primary global server archives (compresses) each version change container. A third party facility may be used to implement a tape archive (TAR) command to compress each version change container. The logic moves to a block 148 where a copy of the archived version change container is encrypted and transmitted to each Secondary global server. To reduce any adverse impact on the bandwidth capacity of the network, each version change container may be broken down into relatively small units that are individually encrypted and transmitted to a Secondary global server.

The logic moves to a block 150 where the Primary global server sends an encrypted message to each Secondary global server to unarchive the version change container. The logic steps to a block 152 where each Secondary global server unarchives the relatively small transmitted units and copies each unarchived source file to a new version in the versioned file tree repository on each Secondary global server.

The logic flows to a block 154 where the Primary global server sends a version delivery list to each Secondary global server. In this case, the version delivery list indicates the current version, however, it should be appreciated that this list could indicate a previous version of the set of source files.

The logic flows to a block 156 where the Primary global server and the Secondary global server build a content update container for each local content server that includes the actual file data (new source files and modified portions of previously existing source files) and indicate each source file to be deleted from the content server. The content update container is based on the two versions identified in the version delivery list. The logic advances to a block 158 where the Primary global server sends an encrypted message to each Secondary global server to copy the new and/or modified source files in the content update container to at least one sub-directory on each local content server.

Moving from FIG. 3B to FIG. 3C, the logic steps to a block 160 where the Primary global server and each Secondary global server gain file level access to the file directory on each local content server and copy the new and/or source files to a sub-directory on each local content server.

Optionally, the logic may move to a block 162 where the Primary and each Secondary global server will disable access to a local content server until the renaming of the current version of the set of source files is completed. In another embodiment, the present invention may start renaming source files from the "bottom" up of a local content server's file directory and may not disable access to the local content server during the copying/renaming process. It is envisioned that the Primary global server may provide a separate encrypted message to each Secondary global server to disable access to the local content servers during the renaming process.

The logic advances to a block 164 where the Primary global server sends an encrypted message to each Secondary global server to update the version of the set of source files stored on each local content server by renaming the actual source file data copied to a sub-directory on each local content server.

At block 165, the Primary and Secondary global servers update the version of the set of source files on each local content server by renaming. A previous version of an individual source file and a deleted source file are removed when the current version of the set of source files are renamed.

Optionally, the logic steps to a block 166 where each Secondary global server will re-enable access to each local content server disabled for the renaming. Also, it is envisioned that the Primary global server may provide a separate encrypted message to each Secondary global server for enabling access to the local content servers after the renaming process is completed. Next, the logic flows to an end block and terminates.

Figure 4:
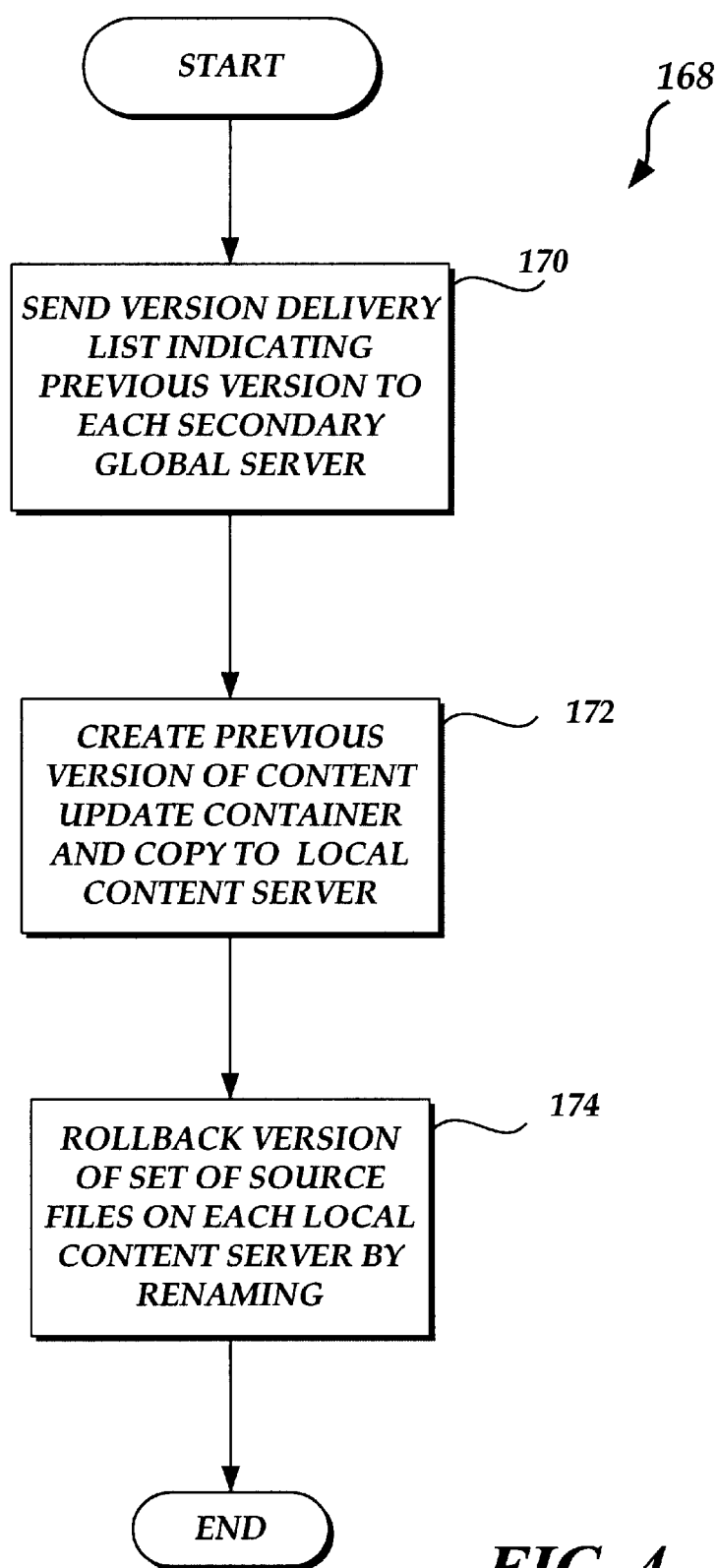
FIG. 4 is a flowchart showing the logic for rolling back a version of files on remotely located content servers.

In FIG. 4, a flow chart is shown illustrating an overview 168 of the logic for "rolling back" the current version of the set of source files stored on local content servers to a previous version. Advancing from a start block, the logic moves to a block 170 where the Primary global server sends a version delivery list to each Secondary global server indicating a previous version of the set of source files stored in a versioned file tree repository on the Secondary global server.

The logic steps to a block 172 where the Primary and Secondary global servers generate a content update container that includes a previous version of the set of source files for each local content server. The Primary and Secondary global servers copy the previous version of modified source files and restore removed source files from the previous version to at least one sub-directory on the local content servers. The logic flows to a block 174 where the Primary and Secondary global servers cause the version of the set of source files on each local content server to roll back by renaming the previous version of the set of source files included in the content update container copied to the a sub-directory on each local content server. Also, any version of the source files that are newer than the previous version are deleted at this time. Next, the logic advances to an end block and terminates.

Although not shown, the present invention may be employed to rollback or increase more than one version of the set of source files at a time. For example, when one content server has a first version of the set of source files and other content servers have the second version of these source files, the present invention will separately update the first version to the second version before updating every content server to the third version of the set of source files.

The present invention is relatively fault tolerant because each (Primary and Secondary) global server can store redundant copies of all of the information stored in the repositories of every other server, e.g., several previous versions of the set of source files. If the Primary global server or any one of the Secondary global servers should fail, the related information can be provided to a replacement (Primary or Secondary) global server from the information stored in a versioned file tree repository on any one of the other operational global servers.

Data Structures

Figure 5A:
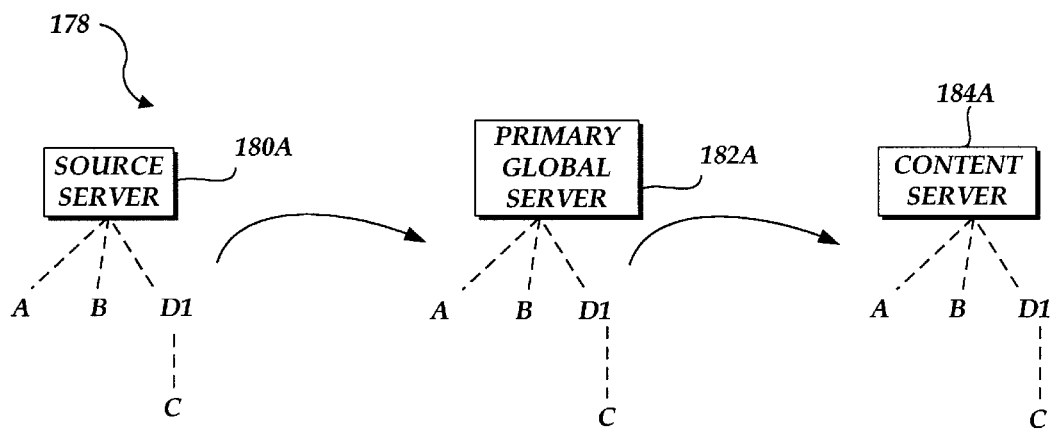
FIG. 5A is an overview of the file directory structure for an initial version of a set of source files that are created on a source server and copied to a Primary global server and a content server.

FIG. 5A illustrates an overview 178 of the file directory structure for a first version of the set of source files that is distributed from a source server 180A to a Primary global server 182A and a content server 184A. For all three of these servers, files "A" and "B" are shown one level below the root directory and file "C" is shown below the "D1" sub-directory root.

Figure 5B:
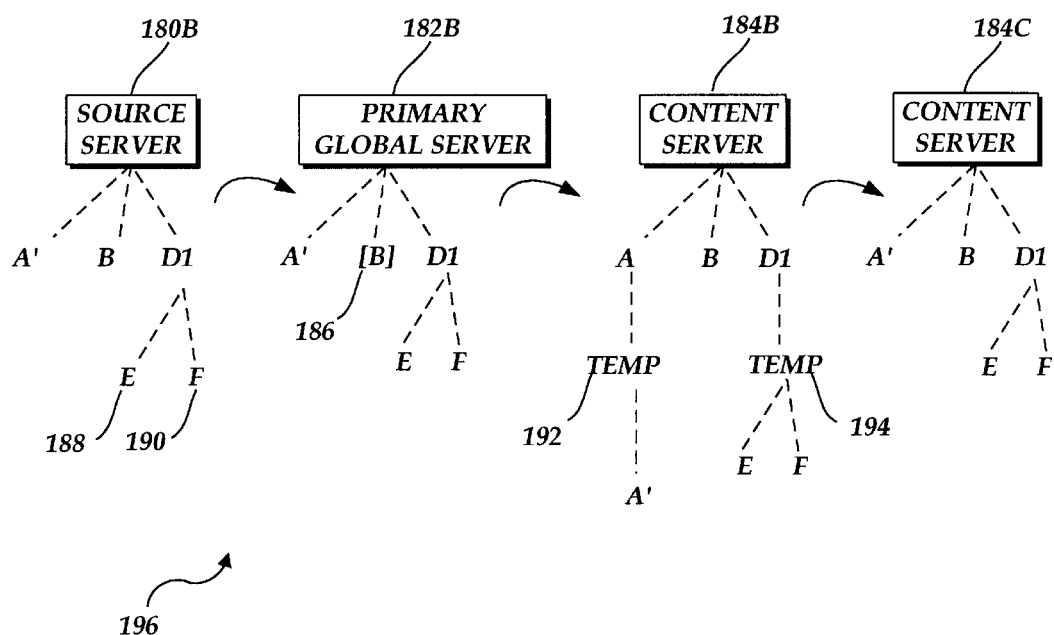
FIG. 5B is an overview of the file directory structure for an updated version of the set of source files that are created on the source server and copied to the Primary global server and the content server.

FIG. 5B shows an overview 196 of the file directory structure at each server when a second version of the set of source files is copied from a source server 180B to a Primary global server 182B and then to a content server 184B. At the source server 180B, the file directory structure of the second version of the set of source files is substantially similar to the first version shown in FIG. 5A except that the "C" file is deleted and new source files "D" and "E" are disposed below the "D1" sub-directory root. Also, the second version of the set of source files includes a modified source file "A'."

At the Primary global server 182B, the file directory structure of the second version of the set of source files is substantially similar to the second version of the set of source files stored at the source server 180B. However, since source file "B" did not change between the first and second versions of the set of source files, the second version includes a reference value 186 indicating that source file "B" in the first version is to be reused in the second version of the set of source files. As a result, the actual size of subsequent versions of the set of source files may be reduced by referencing unchanged source files that were previously stored on the Primary global server 182B.

Additionally, prior to the renaming method discussed in greater detail above, the file directory structure of the second version of the set of source files on content server 184B is substantially similar to the second version stored at the source server 180B. Except that under the root directory a temporary sub-directory 192 was created for the changed source file "A'." Also, a temporary sub-directory 194 was created under sub-directory root "D1" for the new files "E" and "F."

Content server 184C shows the second version of the file directory structure for the set of source files after renaming has occurred. The temp directory 192 is deleted and source file "A'" has replaced the previous version source file "A." Also, the temp directory 194 is deleted and the new source files "E" and "F" are under the "D1" sub-directory.

Figure 6A:
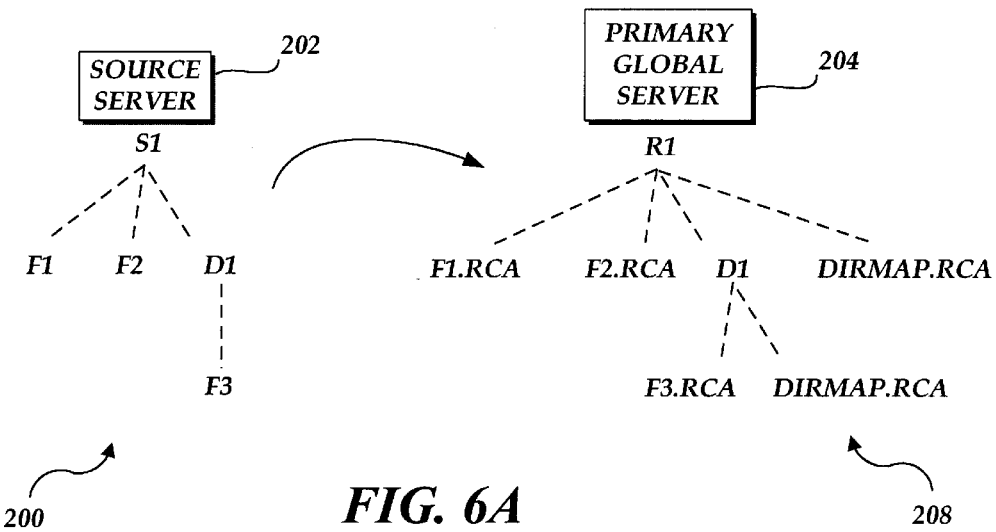
FIG. 6A is an overview of the initial versioning of a source tree that is created on the source server and copied to the Primary global server.

In FIG. 6A, a file tree 200 representing a set of source files on a source server 202 is shown. Directly below an "S1" root directory, two source files "F1" and "F2" are positioned along with a "D1" sub-directory which is a root for a source file "F3." Further, each source file in the file tree 200 is represented in a versioned file tree repository 208 of RCE archived source files with an RCA file extension. However, it is understood that other types of libraries may be employed with the present invention to archive a source file and produce an archived source file with another file extension.

In the versioned file tree repository 208, two RCE archived source files "F1.RCA" and "F2.RCA," a sub-directory "D1" and a directory map "DIRMAP.RCA" are located below an "R1" root directory, i.e., R1/F1 RCA, R1/F2.RCA, R1/D1 and R1/DIRMAP.RCA. Also, an archived source file "F3.RCA" and a directory map "DIRMAP.RCA" are disposed below the "D1" sub-directory level, i.e., R1/D1/F3.RCA and R1/D1/DIRMAP.RCA.

Each level of the versioned file tree repository 208 includes an RCE archived directory map file named DIRMAP.RCA. For each version of the set of source files copied from the source servers and archived on the Primary global server, the directory map file includes the name, size and time stamp for each RCE archived source file and sub-directory at the same directory level in the versioned file tree repository 208 as the particular directory map file. Also, for the top level directory map file, the present invention generates an alias name that maps a particular version of the set of RCE archived source files to the actual version of the set of source files that are provided to the local content servers.

For example, when the initial version of the actual set of source files is provided to the local content servers, the top level directory map (R1/DIRMAP.RCA) will include a versioned list that maps the initial version value ("1.1") to a set of RCE archived source files and an alias name. In this case, the list for R1/DIRMAP.RCA would include <F1, 1.1>, <F2, 1.1>, <D1, 1.1.>and <V1, 1.1>. Similarly, the list for the "D1" sub-directory map file (R1/D1/DIRMAP.RCA) would include <F3, 1.1>. It is to be appreciated that only the top level directory map file contains an alias name ("V1") to map the actual version of the set source files provided to the content servers to the version of the RCE archived set of source files on the Primary global server.

Figure 6B:
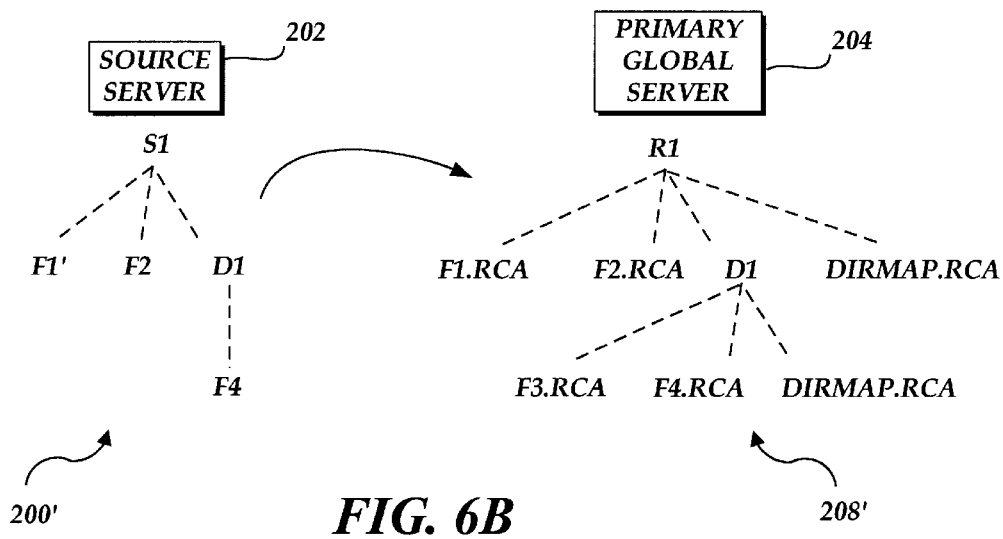
FIG. 6B is an overview of the second versioning of a source tree that is modified on the source server and copied to the Primary global server.

FIG. 6B shows a modified file tree 200' for a second version of the set of source files created on the source server 202. Directly below the "S1" root directory is disposed a modified source file "F1'," the previously existing and unchanged source file "F2" and the "D1" sub-directory for a new source file "F4." A modified versioned file tree repository 208' for the set of RCE archived source files is located on the Primary global server 204 below the "R1" root directory which includes the modified RCE archived source file "F1.RCA," a directory map "DIRMAP.RCA," the unchanged RCE archive source file "F2.RCA" and a sub-directory "D1." Also, below the "D1" sub-directory level is disposed the previously existing RCE archive source file "F3.RCA" that is deleted from the second version of the set of source files on the source server 202, a new RCE archived source file "F4.RCA" and another directory map "DIRMAP.RCA."

The RCE library provides for automatically incrementing the version of new and changed archived source files. In this case, the second version value ("1.2") is automatically associated with the changed RCE archived source file "F1.RCA and the new RCE archived source file "F4.RCA." Also, the alias name of "V2" is mapped to the RCE archived source files associated with the second version value ("1.2"). In this exemplary embodiment, the top level directory map file (R1/IDIRMAP.RCA) contains a list that associates first and second version values with RCE archived source files, sub-directories and alias names, e.g., the R1/DIRMAP.RCA list contains <F1, 1.2>, <F2, 1.1>, <D1, 1.2.>, <V1, 1.1>and <V2, 1.2>. It is further envisioned that each modified RCE archived source file will contain every previous version of the file, e.g., "F1.RCA" would include the 1.1 and the 1.2 versions of the RCE archived source file. Similarly, the sub-directory directory map file (R1/D1/DIRMAP.RCA) would contain a list that includes <F3, 1.1> and <F4, 1.2>.

It is important to note that the alias names ("V1" and "V2") in the top level directory map file are used to reference all of the new or changed files for each version in the versioned file repository of the set of RCE archived source files. In this way, the present invention can employ the alias names to support duplicate versioned file tree repositories when the version sequence for updating a set of source files is not identical for every content server. Also, the use of an alias name enables the present invention to only touch/access the new/changed RCE archived source files and directories when updating the version of a set of source files on a local content server.

In the example discussed above, the first and second versions ("1.1" and "1.2") of the actual set of source files provided to the local content servers were associated with the alias names "V1" and "V2," respectively. However, it is envisioned that a subsequent version upgrade to the actual set of source files provided to a local content server might skip a version that is RCE archived on the Primary global server. For example, a fourth version of the set of RCE archived source files could be employed to provide the third version upgrade to the set of source files on the local content servers. In this case, an alias name of "V4" would be mapped to the third version upgrade ("1.3") of the set of RCE archived source files stored in a versioned file tree repository on the Secondary global server.

System Configuration

Figure 7:
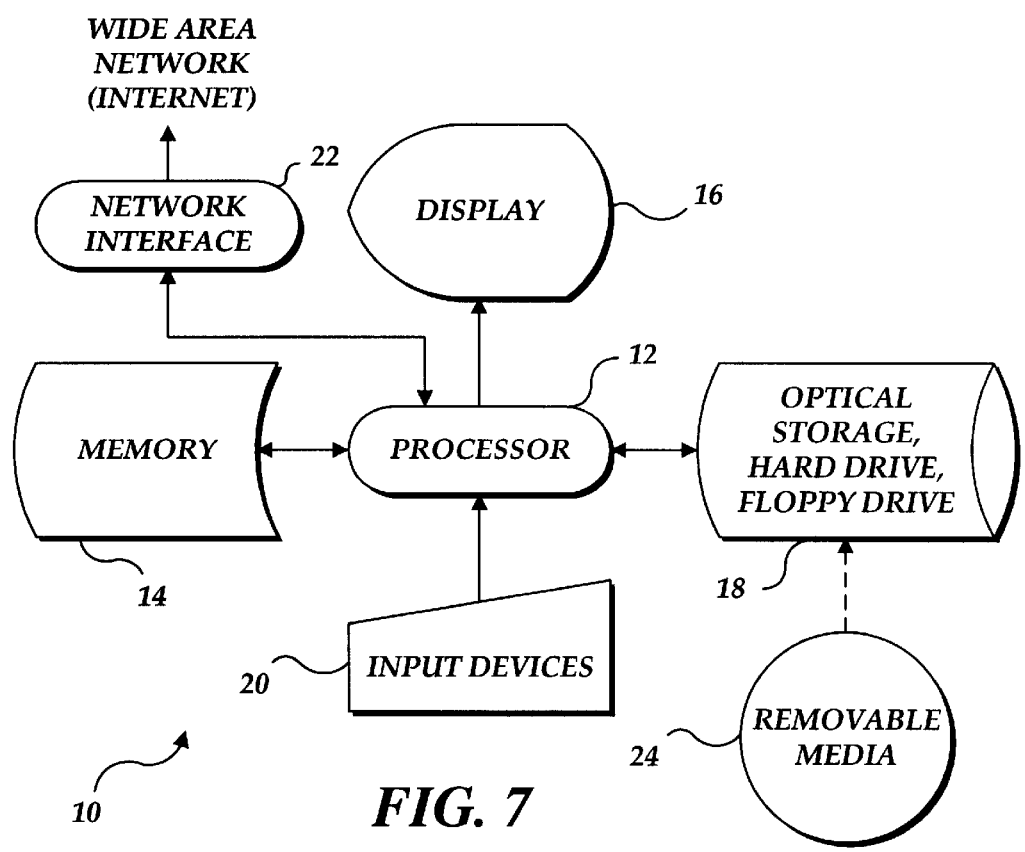
FIG. 7 illustrates an exemplary server computer system.

FIG. 7 is a pictorial diagram of a Primary global server 10 suitable for executing an application program embodying the present invention. FIG. 7 shows a processor 12 coupled bi-directionally to a memory 14 that encompasses read only memory (ROM) and random access memory (RAM). ROM is typically used for storing processor specific machine code necessary to bootup the computer comprising the Primary global server 10, to enable input and output functions, and to carry out other basic aspects of its operation. Prior to running any application program, the machine language code comprising the program is loaded into RAM within memory 14 and then executed by processor 12. Processor 12 is coupled to a display 16 on which the visualization of an HTML response discussed above is presented to a user. Often, programs and data are retained in a nonvolatile memory media that may be accessed by a compact disk-read only memory (CD-ROM) drive, compact disk-read/write memory (CD-R/W) drive, optical drive, digital versatile disc (DVD) drive, hard drive, tape drive and floppy disk drive, all generally indicated by reference numeral 18 in FIG. 7. A network interface 22 couples the processor 12 to a wide area network such as the Internet.

As noted above, embodiments of the present invention can be distributed for use on the computer system for the Primary global server 10 as machine instructions stored on a memory media such as a floppy disk 24 that is read by the floppy disk drive. The program would then typically be stored on the hard drive so that when the user elects to execute the application program to carry out the present invention, the machine instructions can readily be loaded into memory 14. Control of the computer and selection of options and input of data are implemented using input devices 20, which typically comprise a keyboard and a pointing device such as a mouse (neither separately shown). Further details of the system for the Primary global server 10 and of the computer comprising it are not illustrated, since they are generally well known to those of ordinary skill in the art. Additionally, computer systems for a Secondary global server and the content server could be configured in substantially the same way as the computer system for the Primary global server 10 illustrated here, albeit different in other ways.

It is to be understood that embodiments of the present invention can be created to support all file based content and applications including GIF, TIFF, AVI, JPEG, MPEG, HTML pages, JAVA scripts, Active Server pages, postscript document format (PDF), ActiveX, JAVA, and application programs. It is envisioned that embodiments of the present invention provides security mechanisms for protecting the delivery of content and application files to content servers. These security mechanisms enable remote administration of the present invention through a secure shell command line (SSH) and a secure socket layer (SSL) for browser based administration.

It is envisioned that embodiments of the present invention will enable a new content server to be deployed with minimal effort. A Primary or Secondary global server can employ the contents of the most current update file tree object to automatically generate a current version of the set of source files for a new local content server. Additionally, an important aspect of the present invention is that proprietary software does not have to be installed on the source servers or content servers to receive the benefits of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Method for updating a version of a set of source files stored on a content server over a network, comprising:
   (a) determining a configuration of each content server on the network, the configuration enabling a source file to be copied to a location on the content server;
   (b) identifying each source file on a source server that is different than any source file stored on a global server;
   (c) copying each identifiably different source file from the source server to the global server, each source file copied from the source server and a set of source files stored on the global server being employed to create a current version of the set of source files on the global server; and
   (d) employing the configuration of each content server to copy the current version of each source file that is included in the set of source files on the global server to a directory created on each content server, whereby the version of the set of source files stored on each content server is updated by renaming the current version of each source file copied to the directory on each content server.

2. The method of claim 1, further comprising:
   (a) renaming each current version of each source file that is copied to the directory created on each content server; and
   (b) deleting the directory created on the content server and deleting another version of each source file that is updated by the renaming of the current version of each source file copied to the directory.

3. The method of claim 2, wherein when the current version of each source file is copied to the directory created on each content server, further comprising disabling access to the set of source files on a particular content server until the renaming of the current version of each source file copied to the directory on the particular content is completed.

4. The method of claim 2, wherein when the current version of each source file is copied to the directory created on each content server, further comprising starting the renaming process with the current version of each copied source file that is furthest away from the root directory of each content server.

5. The method of claim 1, further comprising archiving each version of the set of source files in a repository on the global server, the archiving causing each source file to be individually compressed and stored as an archived object in the repository associated with the global server.

6. The method of claim 5, further comprising:
   (a) when a return to a previous version of the set of source files is requested, retrieving each archived object associated with the previous version of the set of source files from the repository associated with the global server;
   (b) unarchiving each archived object associated with the previous version of the set of source files to reconstitute each source file needed to upgrade the set of source files on the content server to the previous version; and
   (c) copying each reconstituted source file to a directory created on each content server, whereby the version of the set of source files on each content server is upgraded to the previous version by renaming the copied reconstituted source files.

7. The method of claim 5, wherein the repository is a versioned file tree repository for the set of source files.

8. The method of claim 1, further comprising enabling a user to edit the configuration for each content server.

9. The method of claim 1, further comprising automatically obtaining the configuration for each content server.

10. The method of claim 1, further comprising employing a file access protocol to gain file level access to each source file, including FTP, NFS, CIFS and MFTP.

11. The method of claim 10, wherein employing the file access protocol to gain file level access to each source file further comprises employing one port to send and receive data that includes a message and a source file.

12. The method of claim 1, wherein a type of the source file includes image, hyper text mark-up language (HTML), script, sound, video, text, picture and application program code.

13. The method of claim 1, further comprising when a new content server is added to the network, employing the current version of the set of source files stored in a repository on the global server and a configuration of the new content server to replicate the current version of the set of source files in at least one directory created on the new content server.

14. The method of claim 1, further comprising:
(a) copying each identifiably different source file from the source server to a primary global server, the primary global server generating a separate container for each secondary global server, each container including the differences between the current version of the set of source files stored on the primary global server and a set of source files stored on each secondary global server associated with the container;
(b) distributing each container from the primary global server to each associated secondary global server, each secondary global server employing the contents of the container to replicate the current version of the set of source files in a repository on the secondary global server; and
(c) copying the current version of each source file stored in the repository on the secondary global server that is identified as necessary to replicate the current version of the set of source files on the content server to another directory created on each content server that is local to the secondary global server.

15. The method of claim 14, further comprising encrypting each message transmitted between the primary global server and each secondary global server.

16. The method of claim 14, further comprising storing the set of source files in a versioned file tree repository on the primary global server and each secondary global server.

17. The method of claim 16, further comprising:
(a) when another global server is added to the network, creating a copy of the versioned file tree repository for the set of source files; and
(b) replicating the versioned file tree repository for the set of source files on the other global server, the other global server employing the set of source files included in the versioned file tree repository to update the version of the set of source files stored on each content server that is local to the other global server.

18. The method of claim 17, wherein a type of the other global server includes primary and secondary.

19. The method of claim 14, wherein the distribution of the container to the secondary global server is automatic.

20. The method of claim 14, wherein the distribution of the container to the secondary global server is selectively enabled by an input.

21. The method of claim 14, wherein the updating to the current version of the set of source files on the content server is automatic.

22. The method of claim 14, wherein the updating to the current version of the set of source files on the content server is selectively enabled by an input.

23. The method of claim 14, further comprising distributing each container in a plurality of packets to the secondary global server, each packet having a size that is less than a size of the container.

24. The method of claim 14, further comprising distributing a particular list to each secondary global server, the list being employed by each secondary global server to identify the particular version for upgrading the set of sources files on each local content server.

25. A system for updating a set of source files on a remotely located content server over a network, comprising:
(a) a global server, comprising:
(i) a memory for storing logical instructions;
(ii) a network interface for communicating over the network; and
(ii) a processor for executing the logical instructions stored in the memory, the execution of the logical instructions causing functions to be performed, including:
(A) determining a configuration of each content server on the network, the configuration enabling a source file to be copied to a location on the content server;
(B) identifying each source file on a source server that is different than any source file stored on a global server;
(C) copying each identifiably different source file from the source server to the global server, each source file copied from the source server and a set of source files stored on the global server being employed to create a current version of the set of source files on the global server; and
(D) employing the configuration of each content server to copy the current version of each source file that is included in the set of source files on the global server to a directory created on each content server, whereby the version of the set of source files stored on each content server is updated by renaming the current version of each source file copied to the directory on each content server.

26. A computer-readable medium having computer-executable instructions for performing logical instructions stored in the medium, the execution of the logical instructions functions to be performed, comprising:
(a) determining a configuration of each content server on the network, the configuration enabling a source file to be copied to a location on the content server;
(b) identifying each source file on a source server that is different than any source file stored on a global server;
(c) copying each identifiably different source file from the source server to the global server, each source file copied from the source server and a set of source files stored on the global server being employed to create a current version of the set of source files on the global server; and
(d) employing the configuration of each content server to copy the current version of each source file that is included in the set of source files on the global server to a directory created on each content server, whereby the version of the set of source files stored on each content server is updated by renaming the current version of each source file copied to the directory on each content server.

27. The method of claim 1, further comprising obtaining the configuration for each content server when the configuration is changed.

28. The method of claim 1, wherein obtaining the configuration of each content server occurs at a determined interval.

29. The method of claim 1, wherein the copying of the current source files on the global server to the directory created on each content server occurs at a determined interval.

30. The method of claim 14, further comprising distributing each container from the primary global server to each associated secondary global server at a determined interval.

31. The system of claim 25, the execution of the logical instructions causing function to be performed, further including obtaining the configuration of each content server on the network when the configuration is changed.

32. The system of claim 25, wherein obtaining the configuration of each content server occurs at a determined interval.

33. The system of claim 25, wherein the copying of the current source files on the global server to the directory created on each content server occurs at a determined interval.

34. The computer-readable medium of claim 26, the execution of the logical instructions functions to be performed, further comprising obtaining the configuration for each content server when the configuration is changed.

35. The computer-readable medium of claim 26, wherein obtaining the configuration of each content server occurs at a determined interval.

36. The computer-readable medium of claim 26, wherein the copying of the current source files on the global server to the directory created on each content server occurs at a determined interval.

37. A method for updating a version of a set of source files stored on a content server over a network, comprising:

(a) determining a configuration of each content server on the network out of band when the configuration is changed, the configuration enabling a source file to be copied to a location on the content server;

(b) identifying each source file on a source server that is different than any source file stored on a global server;

(c) copying each identifiably different source file from the source server to the global server, each source file copied from the source server and a set of source files stored on the global server being employed to create a current version of the set of source files on the global server; and (d) employing the configuration of each content server to copy the current version of each source file that is included in the set of source files on the global server to a directory created on each content server at a determined interval, whereby the version of the set of source files stored on each content server is updated by renaming the current version of each source file copied to the directory on each content server.

38. The method of claim 37, further comprising:

(a) copying each identifiably different source file from the source server to a primary global server, the primary global server generating a separate container for each secondary global server, each container including the differences between the current version of the set of source files stored on the primary global server and a set of source files stored on each secondary global server associated with the container;

(b) distributing each container from the primary global server to each associated secondary global server at the determined interval, each secondary global server employing the contents of the container to replicate the current version of the set of source files in a repository on the secondary global server; and (c) copying the current version of each source file stored in the repository on the secondary global server that is identified to replicate the current version of the set of source files on the content server to another directory created on each content server that is local to the secondary global server.

39. The method of claim 37, wherein the determining of the configuration occurs at a predetermined interval.

40. A modulated data signal having computer-executable instructions, the execution of the computer-executable instructions causing actions, comprising:

(a) determining a configuration of each content server on the network when the configuration is changed, the configuration enabling a source file to be copied to a location on the content server;

(b) identifying each source file on a source server that is different than any source file stored on a global server;

(c) copying each identifiably different source file from the source server to the global server, each source file copied from the source server and a set of source files stored on the global server being employed to create a current version of the set of source files on the global server; and (d) employing the configuration of each content server to copy the current version of each source file that is included in the set of source files on the global server to a directory created on each content server at a determined interval, whereby the version of the set of source files stored on each content server is updated by renaming the current version of each source file copied to the directory on each content server.

41. The modulated data signal of claim 40, the execution of the computer-executable instructions causing actions, further comprising:

(a) copying each identifiably different source file from the source server to a primary global server, the primary global server generating a separate container for each secondary global server, each container including the differences between the current version of the set of source files stored on the primary global server and a set of source files stored on each secondary global server associated with the container;

(b) distributing each container from the primary global server to each associated secondary global server at the determined interval, each secondary global server employing the contents of the container to replicate the current version of the set of source files in a repository on the secondary global server; and (c) copying the current version of each source file stored in the repository on the secondary global server that is identified to replicate the current version of the set of source files on the content server to another directory created on each content server that is local to the secondary global server.

42. The modulated data signal of claim 40, wherein determining the configuration of each content server occurs out of band at a determined interval.

* * * * *

UNITED STATES PATENT AND TRADEMARK OFFICE
CERTIFICATE OF CORRECTION

PATENT NO. : 6,405,219 B2
DATED : June 11, 2002
INVENTOR(S) : Christian D. Saether et al.

It is certified that error appears in the above-identified patent and that said Letters Patent is hereby corrected as shown below:

<u>Column 12,</u>
Line 19, "(R1/IDIRMAP.RCA)" should read -- (R1/DIRMAP.RCA) --

Signed and Sealed this

Fifteenth Day of October, 2002

*Attest:*

*Attesting Officer*

JAMES E. ROGAN
*Director of the United States Patent and Trademark Office*